United States Patent
Stenerson et al.

(10) Patent No.: US 7,289,424 B1
(45) Date of Patent: Oct. 30, 2007

(54) METHOD AND SYSTEM FOR IMPLEMENTING A BASEBAND COMPRESSION SCHEME FOR A NONLINEAR MULTIPLYING UP-CONVERTER FOR QPSK AND OQPSK

(75) Inventors: Roger Stenerson, Sunnyvale, CA (US); WeiMin Zhang, San Jose, CA (US)

(73) Assignee: Broadlogic Network Technologies, Inc., San Jose, CA (US)

( * ) Notice: Subject to any disclaimer, the term of this patent is extended or adjusted under 35 U.S.C. 154(b) by 1092 days.

(21) Appl. No.: 10/269,741

(22) Filed: Oct. 11, 2002

Related U.S. Application Data

(60) Provisional application No. 60/329,226, filed on Oct. 11, 2001.

(51) Int. Cl.
  *H04J 9/00* (2006.01)
(52) U.S. Cl. .................. 370/204; 370/316; 375/316
(58) Field of Classification Search ...... None
  See application file for complete search history.

(56) References Cited

U.S. PATENT DOCUMENTS 4,404,532 A * 9/1983 Welti ........................ 332/103
5,130,803 A * 7/1992 Kurita et al. ................. 725/68
6,047,023 A * 4/2000 Arnstein .................... 375/229
6,466,832 B1 * 10/2002 Zuqert et al. ................ 700/94

* cited by examiner

*Primary Examiner*—Duc Ho
(74) *Attorney, Agent, or Firm*—Townsend and Townsend and Crew LLP

(57) ABSTRACT

A system for implementing a base band compression scheme for a nonlinear multiplying up-converter for QPSK and OQPSK includes a bit combining module, a quadrant remap module, a look-up table (LUT) and a zoom adjust module. The bit combining module is configured to generate an address based on a number of symbols received as input data. Using the address provided by the bit combining module, the quadrant remap module remaps symbols from quadrants "2", "3" and "4" to quadrant "1" and generates signals to look up corresponding output data from the LUT. The zoom adjust module generates a number of solutions corresponding to the input data using the corresponding output data retrieved from the LUT. The zoom adjust module is then used to select the best output from the solutions to provide a smooth output signal that does not have any discontinuities.

19 Claims, 5 Drawing Sheets

METHOD AND SYSTEM FOR IMPLEMENTING A BASEBAND COMPRESSION SCHEME FOR A NONLINEAR MULTIPLYING UP-CONVERTER FOR QPSK AND OQPSK

CROSS-REFERENCES TO RELATED APPLICATIONS

The present application claims the benefit of priority under 35 U.S.C. § 119 from U.S. Provisional Patent Application Ser. No. 60/329,226, filed Oct. 11, 2001, entitled "BASE BAND COMPRESSION SCHEME FOR NONLINEAR MULTIPLYING UP CONVERTER FOR QPSK AND OQPSK", by Stenerson et al., the disclosure of which is hereby incorporated by reference in its entirety for all purposes as if set forth in full herein.

BACKGROUND OF THE INVENTION

The present invention generally relates to base band compression and, more specifically, to a method and system for implementing a base band compression scheme for nonlinear multiplying up converter for QPSK and OQPSK.

Base band compression has been in use for years in communications and networking equipment and systems. Conventional base band compressors are typically implemented using a linear up-converter.

Various conventional implementations of base band compressors, however, suffer from a number of disadvantages and/or shortcomings. For example, with conventional base band compressors, the outdoor unit (ODU) is responsible for performing frequency tuning. When frequency tuning is done at the ODU, the complexity of the ODU accordingly increases. Furthermore, this increase in complexity also leads to an increase in implementation cost.

In addition, the ODU generally uses a linear up-converter to provide base band compression. Use of the linear up-converter incurs relatively high implementation cost. This is because in order to maintain the linear signal characteristics needed for the linear up-converter, complex circuitry and components are required. The complex circuitry and components are typically more expensive to implement.

Hence, it would be desirable to provide a method and system that is capable of providing base band compression at a lower cost.

SUMMARY OF THE INVENTION

A system for implementing a base band compression scheme for a nonlinear multiplying up-converter for QPSK and OQPSK is provided. In one exemplary embodiment, the system includes a bit combining module, a quadrant remap module, a look-up table (LUT) and a zoom adjust module. The bit combining module is configured to generate an address based on a number of symbols received as input data. The LUT contains data from quadrant "1". It should be noted that the a data point from another quadrant (i.e., quadrants "2", "3" or "4") has an equivalent in quadrant "1". Using the address provided by the bit combining module, the quadrant remap module remaps symbols from quadrants "2", "3" and "4" to quadrant "1" and generates signals to look up corresponding output data from the LUT. Since the remapped symbols may have originated from a quadrant other than quadrant "1", an appropriate correction is made to the corresponding output data. This correction is provided by the zoom adjust module. Since the input data may have one or more corresponding solutions, the corresponding output data from the LUT is used by the zoom adjust module to generate such solutions. The zoom adjust module is then also used to select the best output from the various solutions generated based on the output data retrieved from the LUT. The best output represents a smooth output signal that does not have any discontinuities.

In an exemplary implementation, the present invention is deployed for QPSK and OQPSK modulators and transmitters in a satellite transmission system.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments will now be described. The general purpose of the present invention is to provide a base band compression scheme for a non-linear multiplying up-converter. The up-converter can be used to provide quadrature or quaternary phase shift keying (QPSK) and offset quadrature phase shift keying (OQPSK). QPSK and OQPSK are digital frequency modulation techniques used for sending data over coaxial cable and wireless networks.

Figure 1:
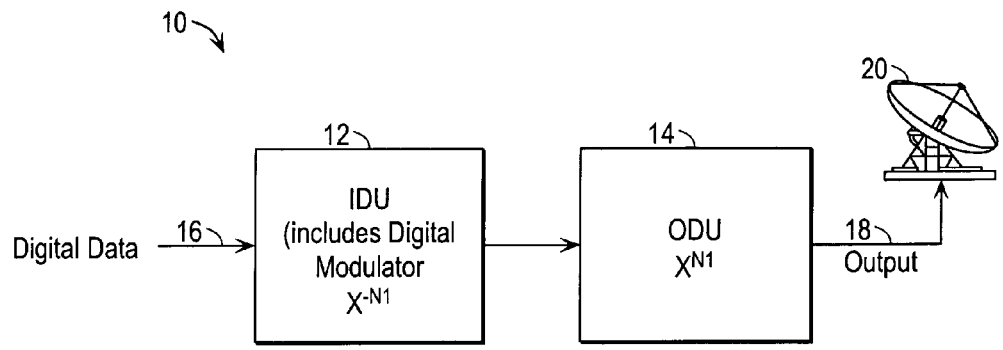
FIG. 1 is a simplified block diagram illustrating an exemplary embodiment of the present invention.
Figure 4:
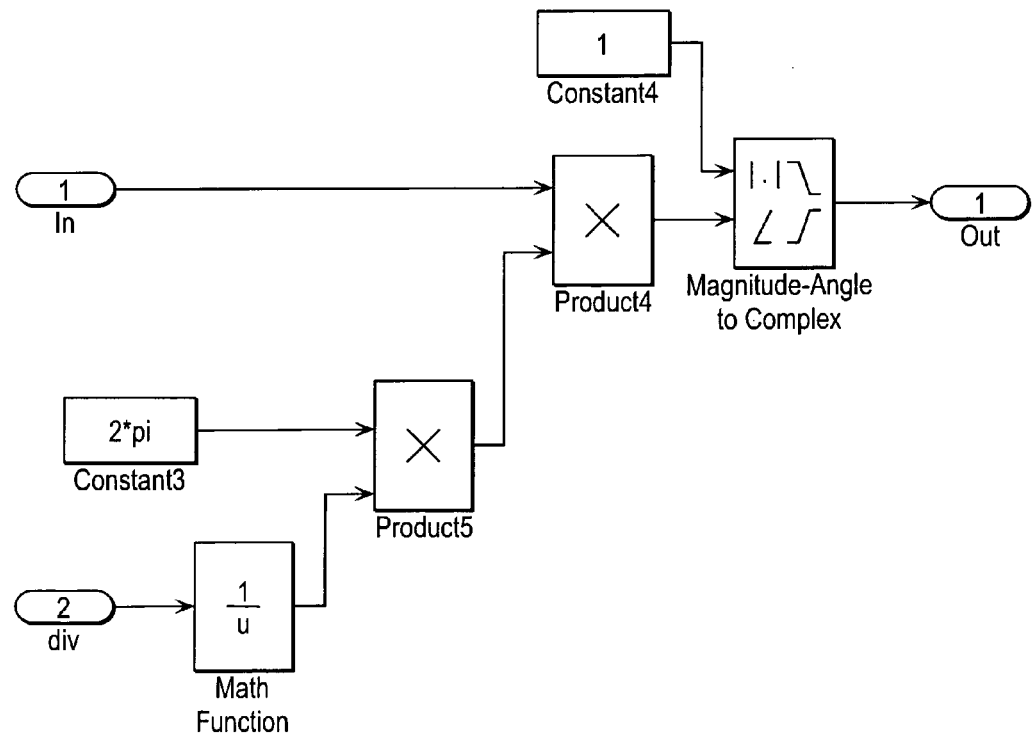
FIG. 4 is a simplified block diagram of an exemplary embodiment of a component "phase LUT 2n*pi//4n" of the digital modulator as shown in FIG. 3 in accordance with the present invention.

FIG. 1 is a simplified block diagram illustrating an exemplary embodiment of the present invention. Referring to FIG. 1, there is shown a system 10 having an indoor unit (IDU) 12 and an outdoor unit (ODU) 14. The IDU 12 receives digital data 16 and is capable of modulating the digital data 16 using QPSK and OQPSK. As will be further described below, the IDU 12 then processes the digital data 16 to generate an Nth root version of the digital data 16. The Nth-root version is then forwarded to the ODU 14. The ODU 14 takes the Nth root version and generates an Nth power of the Nth root version to produce an output signal 18. The value of N may vary depending on a number of factors including, for example, design specification and/or system constraints and requirements. Based on the disclosure and teachings provided herein, a person of ordinary skill in the art will know how to select the proper value for N. In an exemplary implementation, N is given a value of "8". That is, the IDU 12 takes the 8th root of the digital data 16. The 8th root version is provided to the ODU 14 which then raises it to the 8th power to generate the output signal 18. The output signal 18 is given to a transmission station 20 for delivery to the desired destination(s).

Figure 2:
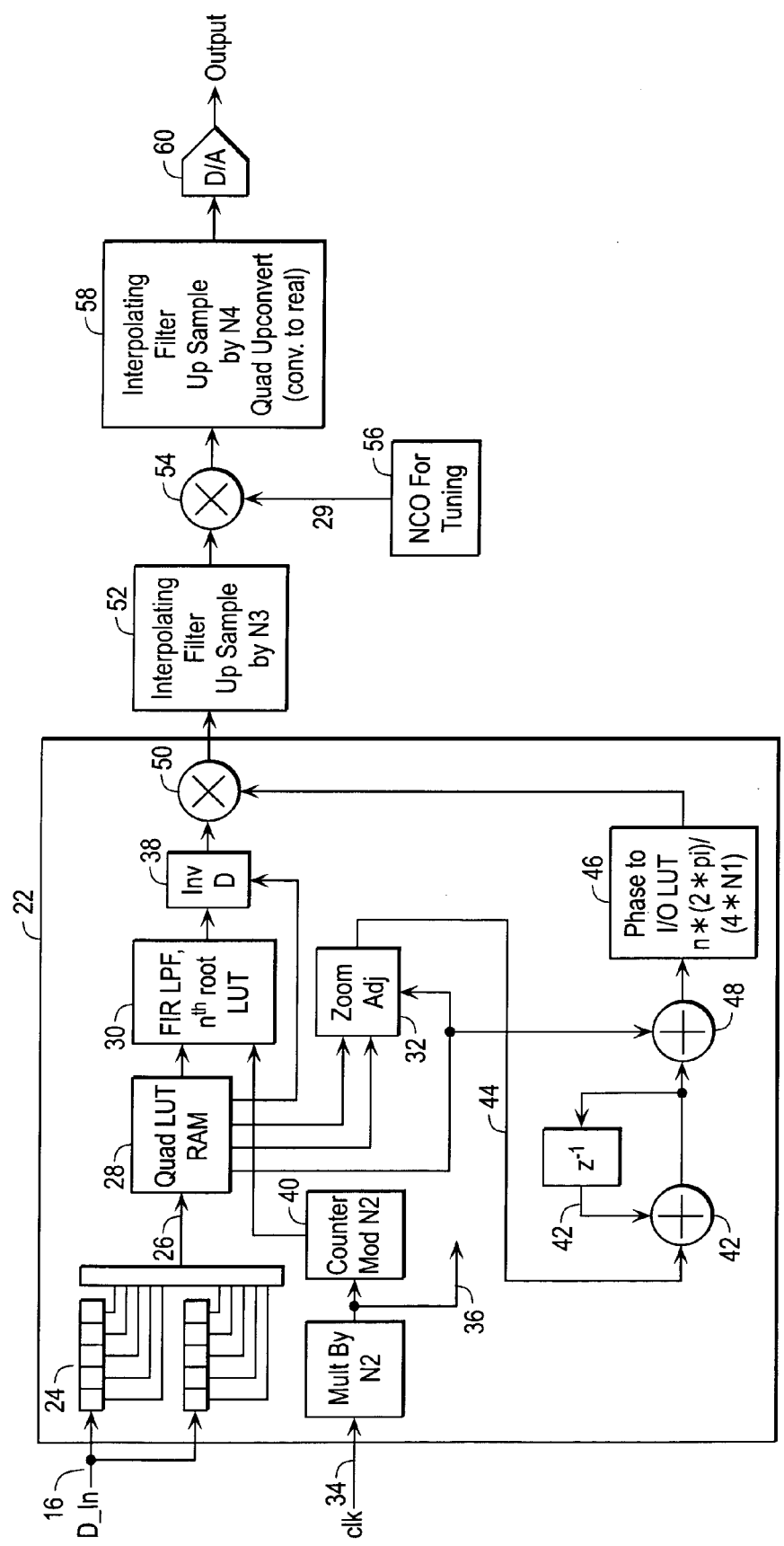
FIG. 2 is a simplified block diagram illustrating an exemplary embodiment of an indoor unit in accordance with the present invention.
Figure 3:
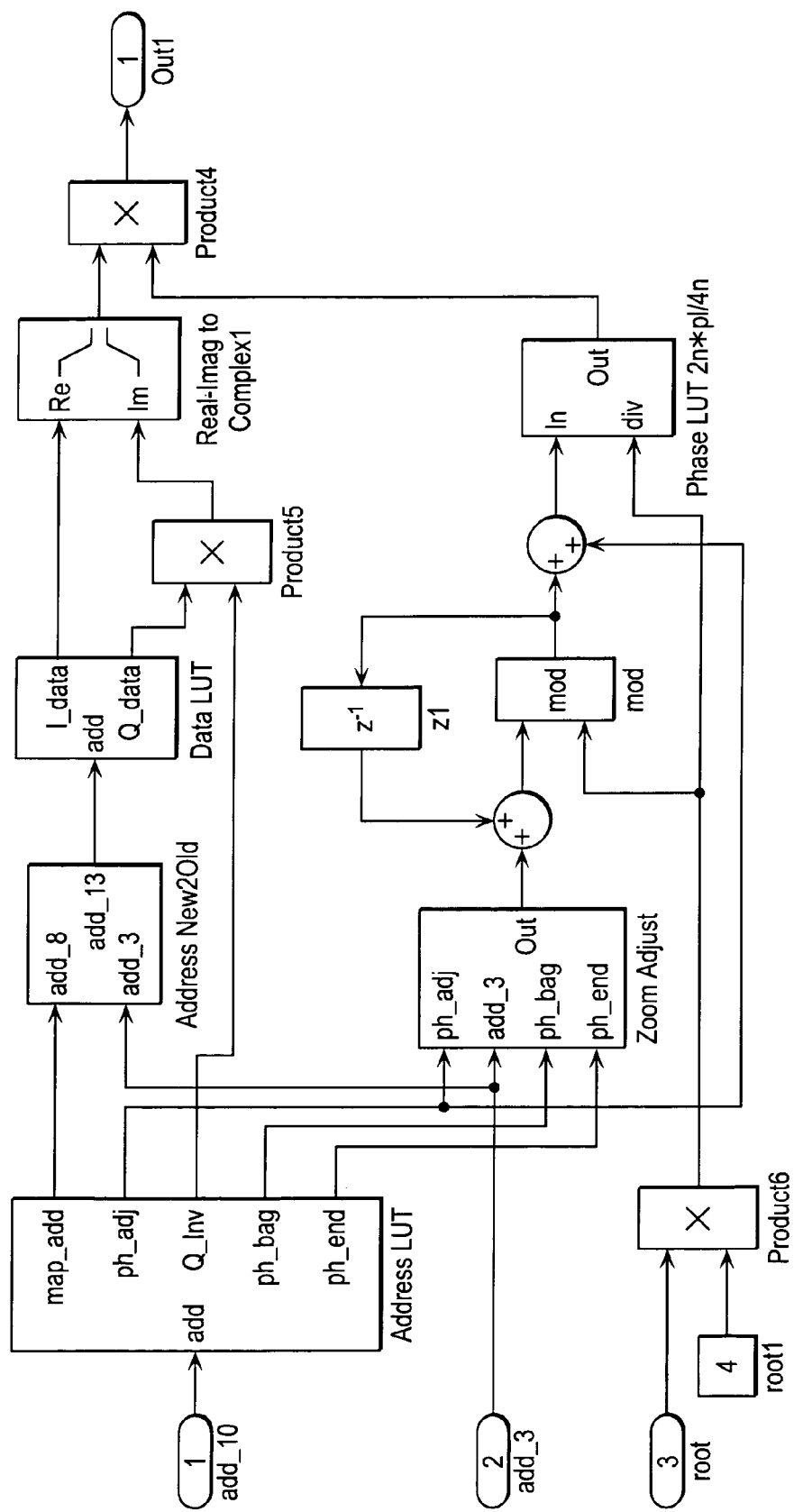
FIG. 3 is a simplified block diagram illustrating an alternative exemplary embodiment of a digital modulator in accordance with the present invention.
Figure 5:
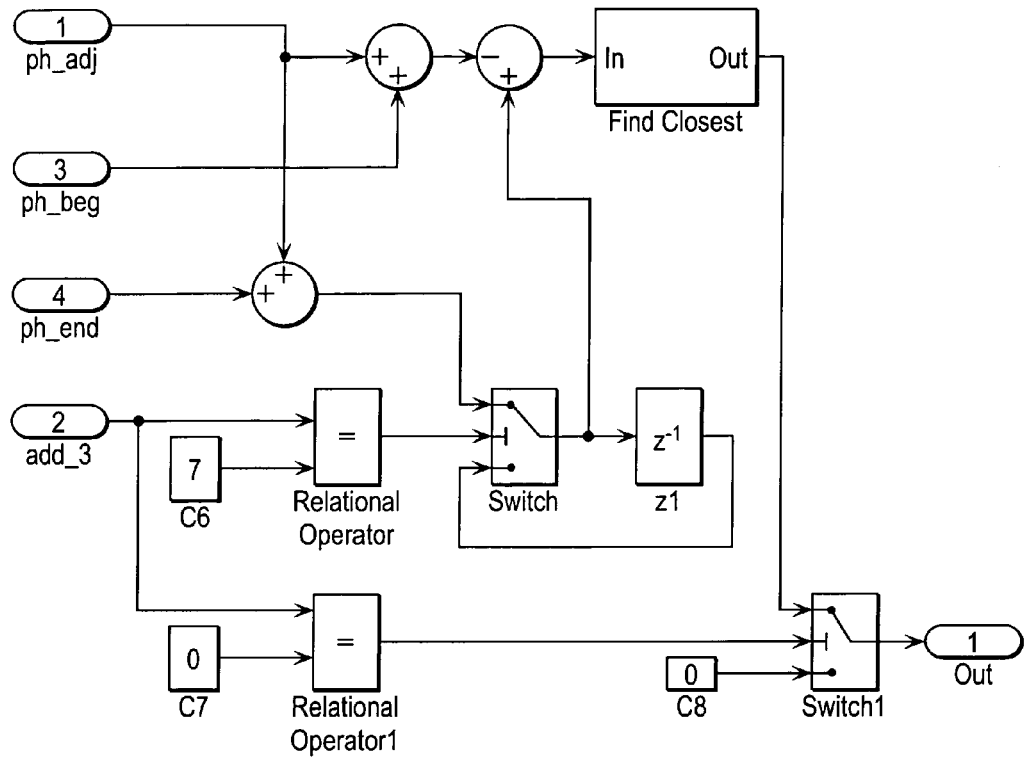
FIG. 5 is a simplified block diagram of an exemplary embodiment of a component "zoom adjust" of the digital modulator as shown in FIG. 3 in accordance with the present invention.
Figure 6:
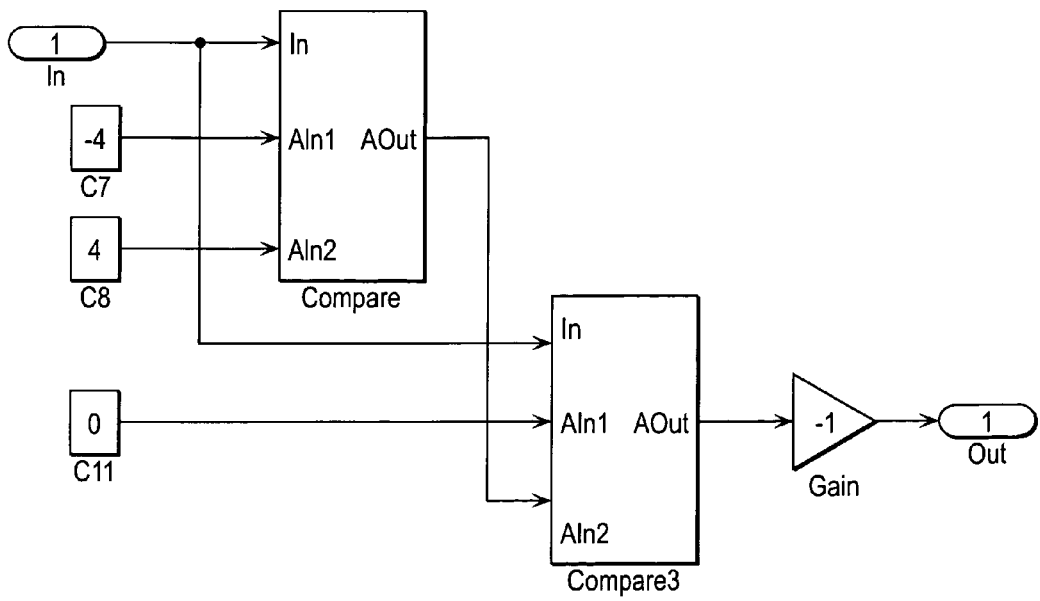
FIG. 6 is a simplified block diagram of an exemplary embodiment of a component "find closest" of the component "zoom adjust" as shown in FIG. 5 in accordance with the present invention.
Figure 7:
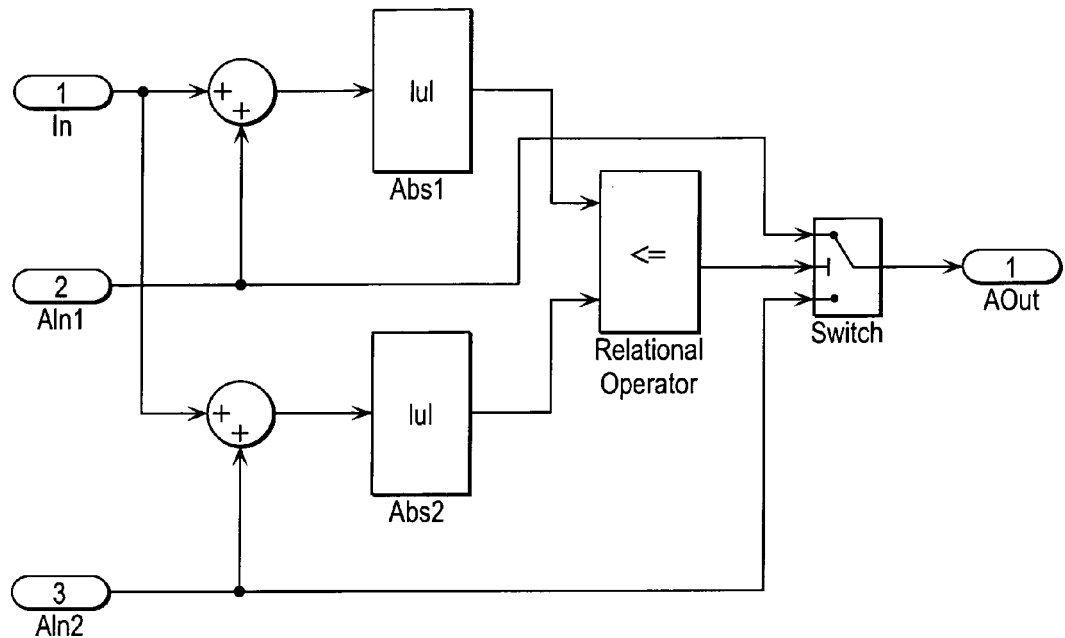
FIG. 7 is a simplified block diagram of an exemplary embodiment of a component "compare" of the component "find closest" as shown in FIG. 6 in accordance with the present invention.
Figure 8:
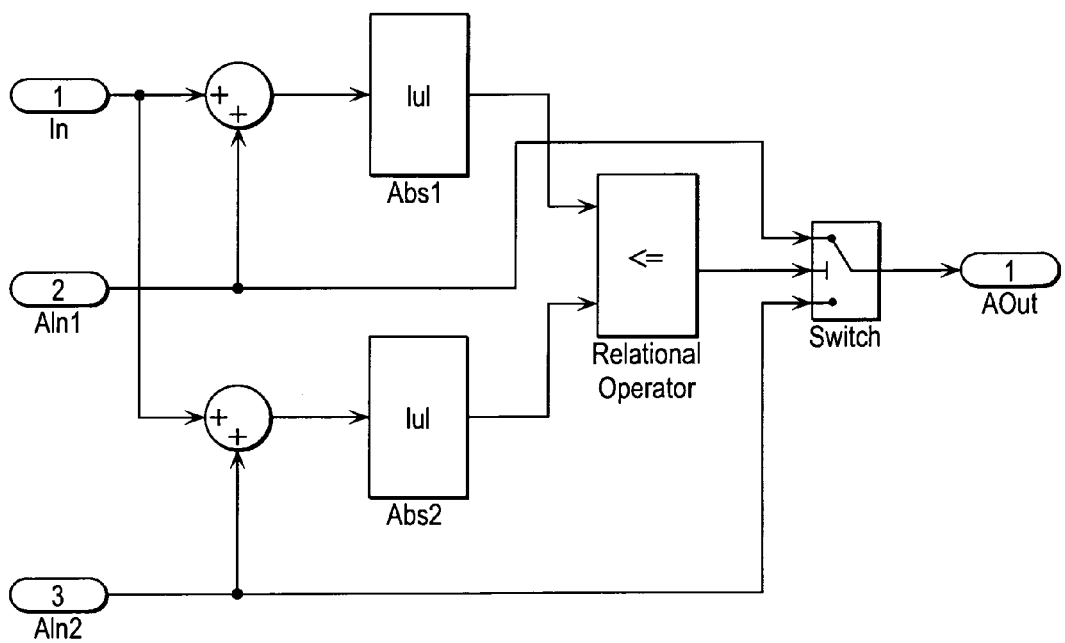
FIG. 8 is a simplified block diagram of an exemplary embodiment of a component "compare3" of the component "find closest" as shown in FIG. 6 in accordance with the present invention.

As mentioned above, the IDU 12 takes the Nth root of the digital data 16. In an exemplary embodiment, the function of taking the Nth root is performed by a digital modulator located within the IDU 12. FIG. 2 is a simplified block diagram illustrating an exemplary embodiment of the IDU 12 in accordance with the present invention. Referring to FIG. 2, the IDU 12 includes a digital modulator 22. The digital modulator 22 further includes a bit combining module 24, a quadrant remap module 28, a look-up table (LUT) 30, and a zoom adjust module 32. The digital modulator 22 generates N2 samples per symbol. The value of N2 may vary depending on a number of factors including, for example, design specification and/or system constraints and requirements. The higher the value of N2, the more accurate the output of the digital modulator 22. In order to maintain better accuracy for the output of the digital modulator 22, it should be noted that, preferably, N and N2 have an inversely proportional relationship, i.e., when the value of N is smaller, the value of N2 is preferably larger. The digital modulator 22 generates an internal clock signal 36 by multiplying an input clock 34 by N2.

The bit combining module 24 generates an address based on five (5) symbols worth of data. More specifically, the bit combining module 24 receives five (5) symbols of history with two (2) bits per symbol, i.e., ten (10) bits are received by the bit combining module 24. The ten (10) bits from the five (5) symbols are then combined to generate a 10-bit address 26. The 10-bit address 26 is then provided to the quadrant remap module 28. It should be noted that the length of the address generated by the bit combining module 24 may vary depending on a number of factors including, for example, design specification and/or system constraints and requirements. Based on the disclosure and teachings provided herein, a person of ordinary skill in the art will know how to determine the appropriate length of the address to be generated by the bit combining module 24.

Using the 10-bit address 26, the quadrant remap module 28 remaps symbols from quadrants "2", "3" and "4" to quadrant "1". This remapping relies on the fact that a data point in another quadrant (quadrants "2", "3" or "4") has an equivalent in quadrant "1". By remapping the symbols from other quadrants into quadrant "1", the size of the LUT 30 is reduced to one-quarter (1/4) of the size that would have been needed to store symbols from all four (4) quadrants. As will be further described below, the LUT 30 only contains data corresponding to quadrant "1". The quadrant remap module 28 then generates the appropriate signals based on the remapped symbols or data to look up the corresponding output data in the LUT 30. Since the data stored in the LUT 30 only represent data from quadrant "1", additional processing is performed to provide a correction or adjustment to take in account that the symbols remapped by the quadrant remap module 28 may have originated from a quadrant other than quadrant "1". In an exemplary embodiment, this additional processing is performed by the zoom adjust module 32. More specifically, the quadrant remap module 28 generates respective signals to direct the zoom adjust module 32 to adjust the output data from the LUT 30 and direct an inversion of Q 38 to be performed, if appropriate.

As mentioned above, the LUT 30 is used to look up data in quadrant "1". That is, the remapped data is looked up in the LUT 30. The looked up data is then held constant for N2 clock cycles while a counter 40 counts from zero (0) to N2-1, thereby generating N2 samples per symbol. The LUT 30 contains the collective output data that is to be selectively output based on the received digital data 16. The LUT 30 can be populated in a number of ways. For example, the collective output data or contents stored in the LUT 30 are computed by running a simulation where all possible inputs are processed. The simulation results are then captured and used to populate the LUT 30. The simulation includes, for example, filtering (SRRC) as well as the N1'th root. Based on the disclosure and teachings provided herein, a person of ordinary skill in the art will know how to populate the LUT 30.

When the LUT 30 is queried, it is possible for it to produce output data that can be used to generate several solutions in response to the received digital data 16. This is because when a root is taken, there are several mathematically correct answers. When N1'th root of a number is computed, there are N1 possible answers, all of which are mathematically correct. For example, when an eighth-root is taken, there are eight (8) possible answers. The several mathematically correct answers can be generated from the output data retrieved from the LUT 30 because, as mentioned above, the LUT 30 contains data from quadrant "1" and a data point in quadrant "1" can be used to find equivalent data points in other quadrants. However, only one of the answers is the optimal, i.e., best for a smooth output signal. A smooth output signal ensures that there are no discontinuities.

The zoom adjust module 32 is responsible for selecting the best answer from a number of mathematically correct solutions when a root of the digital data 16 is taken. In other words, the zoom adjust module 32 compares all the possible roots generated from the output data retrieved from the LUT 30 and selects the best one. More specifically, the zoom adjust module 32 uses signals or control bits generated by the quadrant remap module 28 as well as past history to generate a signal that is used to rotate the output of the LUT 30 such that its phase is continuous and optimal. In one exemplary implementation, as shown in FIG. 2, the foregoing function is implemented using two (2) accumulators 42, 44, an adder 48, a sin/cos LUT 46 and a complex multiplier 50.

The output of the digital modulator 22 is then passed to the remaining components of the IDU 12. More specifically, the output of the digital modulator 22 is upsampled by N3, tuned by a numerically controlled oscillator 56 and finally upsampled by a factor of four (4) with a conversion from complex to real. The output is then converted to analog by an digital/analog converter 60 and passed to the ODU 14 for transmission.

It should be understood that the present invention as described herein can be implemented using software, hardware or a combination of both. Based on the disclosure and teachings provided herein, a person of ordinary skill in the art will be know of other ways/methods to implement the present invention.

The present invention can be deployed and/or applied in a various types of applications. For example, in an exemplary application, the present invention can be deployed in digital QPSK and OQPSK modulators and transmitters in a satellite communications system. A person of ordinary skill in the art will know of other ways and/or methods to apply the present invention.

Furthermore, based on the disclosure and teachings provided herein, it will appreciated by a person of ordinary skill in the art that the present invention results in a number of advantages and benefits. For example, as mentioned above, the present invention results in reduction of implementation cost for outdoor units. Based on the disclosure and teachings provided herein, a person of ordinary skill in the art will realize other advantages and benefits provided by the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A communications system comprising:
   an indoor unit configured to receive digital data, the indoor unit including,
      circuitry that calculates an Nth-root version of the digital data, and
      circuitry that modulates the Nth-root version to provide a signal at a particular frequency; and
   an outdoor unit configured to receive the signal from the indoor unit containing the Nth-root version of the digital data, to generate an Nth-power of the Nth-root version of the digital data, and to generate an output signal at a frequency that is higher than the particular frequency.

2. The communications system of claim 1 wherein the the circuitry that calculates the Nth-root version of the digital data is part of a digital modulator, and the digital modulator further comprises:
   a bit combining module configured to receive the digital data and generate an address based on the digital data, wherein the digital data represents an input signal;
   a quadrant remap module configured to remap the digital data to a first quadrant and generate a first signal in response to the address;
   a look-up table containing a plurality of output entries, wherein:
      each output entry is configured to be used to generate a plurality of output signals corresponding to the input signal,
      the plurality of output entries represent quadrant data that are mapped to the first quadrant from second, third and fourth quadrants, and
      the look-up table produces an output entry in response to the first signal; and
   a zoom adjust module configured to adjust the output entry produced by the look-up table in response to the first signal and select one of the plurality of output signals corresponding to the output entry.

3. The communications system of claim 2 wherein the selected output signal represents an output signal that does not have any discontinuities.

4. The communications system of claim 2 wherein the output entry produced by the look-up table in response to the first signal is adjusted to provide for the situation where the input signal comes from the second, third or fourth quadrant.

5. The communications system of claim 2 wherein the digital modulator is implemented using software, hardware or a combination of both.

6. The communications system of claim 1 wherein the output signal is used in satellite communications.

7. The communications system of claim 1 wherein:
   the circuitry that calculates the Nth-root version of the digital data is part of a digital modulator;
   the digital modulator provides a baseband signal incorporating the Nth-root version of the digital data; and
   the circuitry that modulates the Nth-root version to provide the signal at the particular frequency includes circuitry outside the digital modulator that converts the baseband signal to the particular frequency.

8. An indoor unit comprising:
   a bit combining module configured to receive digital data and generate an address based on the digital data, wherein the digital data represents an input signal;
   a quadrant remap module configured to remap the digital data to a first quadrant and generate a first signal in response to the address;
   a look-up table containing a plurality of output entries, wherein:
      each output entry is configured to be used to generate a plurality of output signals corresponding to the input signal,
      the plurality of output entries represent quadrant data that are mapped to the first quadrant from second, third and fourth quadrants, and
      the look-up table produces an output entry in response to the first signal; and
   a zoom adjust module configured to adjust the output entry produced by the look-up table in response to the first signal and select one of the plurality of output signals corresponding to the output entry.

9. The indoor unit of claim 8 wherein the output entry produced by the look-up table in response to the first signal is adjusted to provide for the situation where the input signal comes from the second, third or fourth quadrant.

10. The indoor unit of claim 8 wherein the selected output signal represents an output signal that does not have any discontinuities.

11. The indoor unit of claim 8 wherein the digital modulator is implemented using software, hardware or a combination of both.

12. A satellite communications system incorporating the indoor unit of claim 8.

13. A digital modulator configured to transmit signals using QPSK and OQPSK, comprising:
   a bit combining module configured to receive digital data and generate an address based on the digital data, wherein the digital data represents an input signal;
   a quadrant remap module configured to remap the digital data to a first quadrant and generate a first signal in response to the address;
   a look-up table containing a plurality of output entries, wherein:
      each output entry is configured to be used to generate a plurality of output signals corresponding to the input signal, the plurality of output entries represent quadrant data that are mapped to the first quadrant from second, third and fourth quadrants, and the look-up table produces an output entry in response to the first signal, and the output entry produced by the look-up table in response to the first signal is adjusted to provide for the situation where the input signal comes from the second, third or fourth quadrant; and a zoom adjust module configured to adjust the output entry produced by the look-up table in response to the first signal and select one of the plurality of output signals corresponding to the output entry, wherein the selected output signal represents an output signal that does not have any discontinuities.

14. The digital modulator of claim 13 wherein the digital modulator is implemented using software, hardware or a combination of both.

15. A communications system incorporating the digital modulator of claim 13.

16. A communications method comprising:

at an indoor unit,
  receiving digital data,
  calculating an Nth-root version of the digital data,
  digitally modulating the Nth-root version to provide a signal at a particular frequency, and
  outputting the signal at the particular frequency; and at an outdoor unit,
  receiving the signal from the indoor unit,
  generating an Nth-power of the Nth-root version of the digital data, and
  generating an output signal at a frequency that is higher than the particular frequency.

17. A communications method comprising:

receiving digital data representing an input signal;

generating an address based on the digital data;

remapping the digital data to a first quadrant, generating a first signal in response to the address;

accessing a look-up table containing a plurality of output entries, wherein:

each output entry is configured to be used to generate a plurality of output signals corresponding to the input signal, the plurality of output entries represent quadrant data that are mapped to the first quadrant from a from second, third and fourth quadrants, and the look-up table produces an output entry in response to the first signal; and adjusting the output entry produced by the look-up table in response to the first signal; and selecting one of the plurality of output signals corresponding to the output entry.

18. The communications method of claim 17 wherein the output entry produced by the look-up table in response to the first signal is adjusted to provide for the situation where the input signal comes from the second, third or fourth quadrant.

19. The communications method of claim 17 wherein the selected output signal represents an output signal that does not have any discontinuities.

* * * * *